US011992901B1

(12) United States Patent
Cao et al.

(10) Patent No.: US 11,992,901 B1
(45) Date of Patent: May 28, 2024

(54) LEAD-FREE AND HALOGEN-FREE SOLDER PASTE

(71) Applicant: DONGGUAN CITY THOUSAND ISLAND METAL FOIL CO., LTD., Guangdong (CN)

(72) Inventors: Jianping Cao, Guangdong (CN); Qiaosheng Ye, Guangdong (CN)

(73) Assignee: DONGGUAN CITY THOUSAND ISLAND METAL FOIL CO., LTD., Guangdong (CN)

( * ) Notice: Subject to any disclaimer, the term of this patent is extended or adjusted under 35 U.S.C. 154(b) by 0 days.

(21) Appl. No.: 18/373,479

(22) Filed: Sep. 27, 2023

(30) Foreign Application Priority Data

Feb. 25, 2023 (CN) .......................... 202310164512.0

(51) Int. Cl.
*B23K 35/02* (2006.01)
*B23K 35/26* (2006.01)
*B23K 35/362* (2006.01)

(52) U.S. Cl.
CPC .......... *B23K 35/025* (2013.01); *B23K 35/262* (2013.01); *B23K 35/362* (2013.01)

(58) Field of Classification Search
CPC ... B23K 35/025; B23K 35/262; B23K 35/362
See application file for complete search history.

(56) References Cited

FOREIGN PATENT DOCUMENTS

| CN | 101412170 A | * | 4/2009 |
|---|---|---|---|
| CN | 101745636 A | * | 6/2010 |
| CN | 102513739 A | * | 6/2012 |
| CN | 102554489 A | * | 7/2012 |
| CN | 104476007 A | | 4/2015 |

OTHER PUBLICATIONS

CN-101745636-A: Espacenet English machine translation (Year: 2010).*
CN-101412170-A: Espacenet English machine translation (Year: 2009).*
CN-102513739-A: Espacenet English machine translation (Year: 2012).*
CN-102554489-A: Espacenet English machine translation (Year: 2012).*
National Standard of the People's Republic of China; Liquid Flux for tin welding; GB/T9491-2002; Apr. 4, 2003; 37 Pgs.
IPC Association Connecting Electronics Industries; IPC-TM-650 Test Methods Manual; Jun. 2004; 4 Pgs.

* cited by examiner

*Primary Examiner* — Adil A. Siddiqui
(74) *Attorney, Agent, or Firm* — Cooper Legal Group, LLC

(57) ABSTRACT

The present application relates to the technical field of welding materials, and particularly to a lead-free and halogen-free solder paste, including a solder alloy powder and a welding flux with a mass ratio of 85-90:10-15, the solder alloy powder is Sn-2.5Be-0.8Ag-0.5Cu alloy powder, and the welding flux includes the following components: itaconic acid, succinic acid, a surfactant, a thixotropic agent, modified rosin, a composite solvent, a corrosion inhibitor, and an acrylic type activator. Its preparation method includes the following steps: mixing the modified rosin, the composite solvent and the corrosion inhibitor, heating under stirring, cooling, adding itaconic acid, succinic acid and the acrylic type activator under stirring, cooling, adding the thixotropic agent for emulsification dispersion, adding the surfactant under stirring, grinding to obtain a welding flux after cooling, and stirring the solder alloy powder and the welding flux under vacuum to obtain the solder paste.

8 Claims, No Drawings

LEAD-FREE AND HALOGEN-FREE SOLDER PASTE

CROSS-REFERENCE TO RELATED APPLICATION

The present application is based on and claims the priority benefits of China application No. 202310164512.0, filed on Feb. 25, 2023. The entirety of China application No. 202310164512.0 is hereby incorporated by reference herein and made a part of this specification.

TECHNICAL FIELD

The present application relates to the technical field of welding materials, and particularly to a lead-free and halogen-free solder paste.

BACKGROUND ART

With the rapid development of electronics industry, the requirement for low temperature welding with thermal sensitivity are rapidly increased, such as in an intelligent hardware radiator, LED assembly mounting, and solar photovoltaic field. Therefore, a solder paste, as a connection material between an electronic component and a circuit board, has a broad application.

The solder paste is a paste obtained by evenly mixing solder alloy powder and welding flux, and is a high-end welding material produced with the rapid development of the SMT Technology. The solder paste provides a solder for forming a welding point and a welding flux promoting for cleaning and wetting surface in reflow soldering, and plays a role of fixing the components before the solder melts. The solder paste is a key connection material in SMT, so its quality directly determines the use reliability of a surface mount device. The electronic component may have a defect such as solder beading, bridging, tombstoning, and non-wetting after reflow soldering if the solder paste used has poor performance, which will seriously affect the normal use of electronic products.

In order to avoid a melting phenomenon of the high temperature solder sealed in the electronic product during SMT reflow soldering, the high temperature solder is required to have a solidus temperature of above 260° C. Currently, a frequently used high temperature solder is an alloy mainly composed of Pb, for example, Sn5-Pb 92.5-Ag2.5 alloy with a solidus temperature of 287° C. and a liquidus temperature of 296° C., Sn5-Sn alloy with a solidus temperature of 300° C. and a liquidus temperature of 314° C., Pb-10Sn alloy with a solidus temperature of 268° C. and a liquidus temperature of 301° C., and Pb-5Ag alloy with a solidus temperature of 304° C. and a liquidus temperature of 365° C.

Further, an activator is often added in the welding flux of the solder paste, so as to remove an oxide on a surface of a welding substrate and assist the solder in wetting a welding disc. An inorganic halide is added in commonly used activator to introduce halogen element, so that the current solder paste contains lead element and halogen element. However, the solder paste is difficult to be recycled, so the lead element and halogen element in the solder paste are difficult to be recycled as well, which causes serious pollution to the environment. Therefore, it is necessary to develop a lead-free and halogen-free solder paste.

A Chinese patent application with a publication no. of CN104476007A disclosed a lead-free and halogen-free solder paste with a high melting point and a preparation method thereof, in which the solder paste includes a solder alloy and a welding flux, main component of the solder alloy is a bismuth-silver alloy containing Ag of 1.5 wt %-10wt % or a bismuth-silver alloy containing Ag of 1.5 wt %-10wt % and a third element of 0.05%-4.0%, and the welding flux contains rosin and an organic acid amine salt activator. However, organic amine is difficult to volatilize during low temperature welding, and a residue after welding commonly has a strong hygroscopicity, so the residue after welding gradually absorbs water in the air to decrease a surface insulation resistance of the substrate. Therefore, the lead-free and halogen-free solder paste needs to be further researched to improve its performance.

SUMMARY

In order to obtain a lead-free and halogen-free solder paste with a better welding performance, the present application provides a lead-free and halogen-free solder paste.

In a first aspect, the present application provides a lead-free and halogen-free solder paste, adopting the following technical solution:

a lead-free and halogen-free solder paste, including a solder alloy powder and a welding flux with a mass ratio of 85-90:10-15, the solder alloy powder is Sn-2.5Be-0.8Ag-0.5Cu alloy powder, and the welding flux includes the following components in parts by weight:
1-3 parts of itaconic acid,
3-5 parts of succinic acid,
1-3 parts of a surfactant,
3-8 parts of a thixotropic agent,
10-20 parts of modified rosin,
20-40 parts of a composite solvent,
3-8 parts of a corrosion inhibitor, and
5-10 parts of an acrylic type activator;
wherein the acrylic type activator is obtained after allyl glycidyl ether and bisphenol A diglycidyl ether are reacted with acrylic acid and acrylic anhydride, as well as cyclohexylamine In the above technical solution, the solder alloy powder in the present application is added with a small amount of Be element based on existing Sn—Ag—Cu solder alloy powder. Be element added can decrease the use of noble metal element Ag, and increase a wettability of the solder to some extent, thereby further improving the welding performance In addition, the activator of the welding flux in the present application is formulated by the succinic acid, the itaconic acid and the acrylic type activator. The activators with different activation temperature and different decomposition temperature are formulated, so as to promote the activity of the welding flux during the whole welding process, and improve the wettability of the solder. Further, in the present application, an acrylic type activator prepared by a specific method is adopted, in which the allyl glycidyl ether and the bisphenol A diglycidyl ether contain epoxy group and unsaturated group. On one hand, the allyl glycidyl ether and the bisphenol A diglycidyl ether open rings to obtain a polyether with side group containing a carbon-carbon double bond at first, then a crosslinked structure is formed under the effect of unsaturated double bonds with the carbon-carbon double bonds of the acrylic acid and acrylic anhydride, as well as the effect of the amino functional group of the cyclohexylamine. On the other hand, the carbon-carbon double bonds of the allyl glycidyl ether and the bisphenol A diglycidyl ether are reacted with vinyl functional groups and amino functional groups of the acrylic acid and acrylic anhydride, to obtain a crosslinked substance containing epoxy group, and the obtained acrylic type activator contains amino group. The amino groups are cooperated with organic acid activator, which is conductive to play a role under welding temperature, further enhancing the activity of the welding flux. However, it is in an inert state at a low temperature. Moreover, the adding method thereof solves the problem that, in the prior art, a surface insulation resistance of the substrate is decreased due to the residue after welding having a strong hygroscopicity when directly adding amine component, thereby increasing welding quality. Further, it is found that, when the itaconic acid is used as the activator, there is a high spreading rate, however, there is viscous residue on the surface of the welding point after welding. However, in the present application, adding the acrylic type activator grafted with the amino group can greatly overcome a defect of the residue after welding caused by itaconic acid, further, there is little residue after welding, and low corrosion, extremely high surface insulation resistance value and excellent performance are achieved.

In an embodiment, the acrylic type activator is prepared by the following raw materials in parts by weight:

20-30 parts of allyl glycidyl ether, 5-10 parts of bisphenol A diglycidyl ether, 15-20 parts of acrylic acid, 5-10 parts of acrylic anhydride, 15-20 parts of cyclohexylamine, 1-3 parts of benzyl 1H-imidazole-1-carbodithioate, and 3-5 parts of tetrahydrofuran.

In an embodiment, the acrylic type activator is prepared by the following method: mixing the allyl glycidyl ether, the bisphenol A diglycidyl ether and the tetrahydrofuran, adding the benzyl 1H-imidazole-1-carbodithioate, adding the acrylic acid, the acrylic anhydride and the cyclohexylamine after mixing, reacting under a γ-ray radiation crosslinked of 50-60 Gy/min for 30-40 min, and reacting in an oil bath of 85-90° C. for 1.5-2 h to obtain the acrylic type activator.

In the above technical solution, the cyclohexylamine, the acrylic acid, the acrylic anhydride, the allyl glycidyl ether and the bisphenol A diglycidyl ether are crosslinked via radiation crosslinking in the presence of benzyl 1H-imidazole-1-carbodithioate to obtain the acrylic type activator.

In an embodiment, the composite solvent is a mixture of methyl propylene glycol, tetrahydrofurfuryl alcohol and propylene glycol monophenyl ether in a weight ratio of 1:(0.6-0.8):(0.5-0.8).

In the above technical solution, the methyl propylene glycol, as a mono-alkyl propylene glycol, can effectively avoid over-reaction between the solder and the activator, so a good stability for storing and working is achieved. The solder paste has good storing performance and low residual performance after welding by selecting the above composite solvent in the system of the present application.

In an embodiment, the modified rosin is a mixture of a hydrogenated rosin and a disproportionated rosin in a weight ratio of 1:(2-3).

In the above technical solution, when the modified rosin is the mixture of hydrogenated rosin and disproportionated rosin, a neutral substance is removed by changing conjugated double bond of the rosin resin acid. Therefore, the modified rosin has better stability than rosin, thereby facilitating improving the welding performance, and preventing the quality of the residue from being affected by unstable rosin.

In an embodiment, the surfactant is a nonionic surfactant, preferably, cocoanut fatty acid diethanolamide.

In the above technical solution, the surfactant is the nonionic surfactant, which can produce an absorption effect on solid surface, decrease interfacial free energy and increase the wettability, so as to increase the wettability and assist-welding performance of the welding flux. Adding a small amount of surfactant can significantly increase the wettability of the welding flux and increase its spreading area.

In an embodiment, the thixotropic agent is polyurea thixotropic agent.

In the above technical solution, when the thixotropic agent is the polyurea thixotropic agent in the system of the present application, the obtained solder paste has better performance.

In an embodiment, the corrosion inhibitor is one or more selected from the group consisting of azole organic corrosion inhibitors and imidazole organic corrosion inhibitors, preferably, benzotriazole.

In the above technical solution, the corrosion inhibitor can quickly generate electrostatic attraction and Van der Waals force with charges on the surface of the solder paste, a whole attraction film is formed in an active reaction zone on the surface of the solder alloy powder, thereby facilitating inhibiting a corrosion effect of active substances in the welding flux on the alloy powder and extending storage life of the solder paste. Further, when the corrosion inhibitor is the azole organic corrosion inhibitors and/or the imidazole organic corrosion inhibitors, especially, the benzotriazole, a complex membrane is covered on the substrate after welding, thereby inhibiting a reaction between the welding point and corrosion factors during service period, delaying copper corrosion and extending the service life of the electronic equipment in a large extent.

In a second aspect, the present application provides a preparation method for the lead-free and halogen-free solder paste, adopting the following technical solution:

a preparation method of the lead-free and halogen-free solder paste, including the following steps:

mixing the modified rosin, the composite solvent and the corrosion inhibitor, heating to 120-130° C. under evenly stirring, cooling to 100-110° C., adding the itaconic acid, the succinic acid and the acrylic type activator under stirring, cooling to 65-80° C., adding the thixotropic agent for emulsification dispersion, then adding the surfactant under stirring, then grinding to obtain a welding flux after cooling, and stirring the solder alloy powder and the welding flux under vacuum to obtain the solder paste.

In the above technical solution, the present application provides an easy preparation method, which is conductive to realize industrialization.

In summary, the present application has at least one of the following beneficial technical effects:
1. the solder alloy powder in the present application is added with a small amount of Be element based on existing Sn—Ag—Cu solder alloy powder. Be element added can decrease the use of noble metal element Ag, and increase a wettability of the solder to some extent, thereby further improving the welding performance
2. the activator of the welding flux in the present application is formulated by the succinic acid, the itaconic acid and the acrylic type activator prepared by specific raw materials and method. The epoxy group and the unsaturated group of the allyl glycidyl ether and the bisphenol A diglycidyl ether, and the double bonds and amino functional groups of the acrylic acid and acrylic anhydride, as well as of the cyclohexylamine are utilized, to obtain a crosslinked structure containing the epoxy group and amino functional groups, which can increase the activity. Further, there is little residue after welding, and low corrosion, extremely high surface insulation resistance value and excellent performance are achieved.

DETAILED DESCRIPTION

The present application will be further described in detail below in combination with the examples. It needs to be noted that, examples without specific description are performed according to conventional conditions or suggestions from manufacturer. The raw materials in the examples are commercially available unless otherwise specified.

In the following examples, a solder alloy powder is made of 96.2 wt % Sn element, 2.5 wt % Be element, 0.8 wt % Ag element and 0.5 wt % Cu element through a centrifugal atomization powder production process, which is an existing process, and is not illustrated in the present application.

The following preparation examples are preparation examples of the acrylic type activator.

Preparation Example 1

A preparation method for an acrylic type activator included the following steps:
25 g of allyl glycidyl ether, 8 g of bisphenol A diglycidyl ether, 4 g of tetrahydrofuran were mixed, then 2 g of benzyl 1H-imidazole-1-carbodithioate was added, 18 g of acrylic acid, 8 g of acrylic anhydride and 18 g of cyclohexylamine were added after mixing, a reaction was performed under a γ-ray radiation crosslinked of 55 Gy/min for 35 min, then in an oil bath of 85° C. for 1.5 h to obtain the acrylic type activator.

Preparation Example 2

A preparation method for an acrylic type activator included the following steps:
mixing 20 g of propylene glycidyl ether, 5 g of bisphenol A diglycidyl ether, 3 g of tetrahydrofuran, then adding 1 g of benzyl 1H-imidazole-1-carbodithioate, adding 15 g of acrylic acid, 5 g of acrylic anhydride and 15 g of cyclohexylamine after mixing, reacting under a γ-ray radiation crosslinked of 50 Gy/min for 40 min, then reacting in an oil bath of 85° C. for 2 h to obtain the acrylic type activator.

Preparation Example 3

A preparation method for an acrylic type activator included the following steps:
mixing 30 g of propylene glycidyl ether, 10 g of bisphenol A diglycidyl ether, 5 g of tetrahydrofuran, then adding 3 g of benzyl 1H-imidazole-1-carbodithioate, adding 20 g of acrylic acid, 10 g of acrylic anhydride and 20 g of cyclohexylamine after mixing, reacting under a γ-ray radiation crosslinked of Gy/min for 30 min, then reacting in an oil bath of 90° C. for 1.5 h to obtain the acrylic type activator.

Preparation Example 4

The preparation method for an acrylic type activator of this preparation example was same as Preparation example 1, except that the raw material did not contain the benzyl 1H-imidazole-1-carbodithioate.

Comparative Preparation Example 1

The preparation method for an acrylic type activator of this comparative preparation example was same as Preparation example 1, except that the bisphenol A diglycidyl ether was replaced by the equivalent amount of allyl glycidyl ether.

Comparative Preparation Example 2

The preparation method for an acrylic type activator of this comparative preparation example was same as Preparation example 1, except that the acrylic anhydride was replaced by equivalent amount of acrylic acid.

Comparative Preparation Example 3

The preparation method for an acrylic type activator of this comparative preparation example was same as Preparation example 1, except that the raw material did not contain the cyclohexylamine Example 1

A preparation method for a lead-free and halogen-free solder paste included the following steps:
mixing 15 g of the modified rosin, 30 g of the composite solvent and 5 g of the corrosion inhibitor, heating to 125° C. under evenly stirring, then cooling to 105° C., adding 2 g of the itaconic acid, 4 g of the succinic acid and 8 g of the acrylic type activator prepared in the Preparation example 1 under stirring, then cooling to 70° C., adding 5 g of the thixotropic agent for emulsification dispersion, then adding 2 g of the surfactant under stirring to obtain a mixture, then cooling the mixture to room temperature, reserving for 2 days, then grinding to obtain a welding flux, and stirring the Sn-2.5Be-0.8Ag-0.5Cu solder alloy powder and the welding flux with a mass radio of 88:12 under vacuum to obtain the solder paste.

In particular, the composite solvent was a mixture of methyl propylene glycol, tetrahydrofurfuryl alcohol and propylene glycol monophenyl ether in a mass ratio of 1:0.7:0.6;
the modified rosin was a mixture of hydrogenated rosin and disproportionated rosin in a mass ratio of 1:2.5;
the surfactant was cocoanut fatty acid diethanolamide;
the thixotropic agent was polyurea thixotropic agent; and
the corrosion inhibitor was benzotriazole.

Example 2

A preparation method for a lead-free and halogen-free solder paste included the following steps:
mixing 10 g of the modified rosin, 20 g of the composite solvent and 3 g of the corrosion inhibitor, heating to 120° C. under evenly stirring, then cooling to 100° C., adding 1 g of the itaconic acid, 3 g of the succinic acid and 5 g of the acrylic type activator prepared in Preparation example 2 under stirring, then cooling to 65° C., adding 3 g of the thixotropic agent for emulsification dispersion, then adding 1 g of the surfactant under stirring to obtain a mixture, then cooling the mixture to room temperature, reserving for 2 days, then grinding to obtain a welding flux, and stirring the Sn-2.5Be-0.8Ag-0.5Cu solder alloy powder and the welding flux with a mass radio of 85:15 under vacuum to obtain the solder paste.

In particular, the composite solvent was a mixture of methyl propylene glycol, tetrahydrofurfuryl alcohol and propylene glycol monophenyl ether in a mass ratio of 1:0.6:0.5;
the modified rosin was a mixture of hydrogenated rosin and disproportionated rosin in a mass ratio of 1:2;
the surfactant was cocoanut fatty acid diethanolamide;
the thixotropic agent was polyurea thixotropic agent; and
the corrosion inhibitor was benzotriazole.

Example 3

A preparation method for a lead-free and halogen-free solder paste included the following steps:
mixing 20 g of the modified rosin, 40 g of the composite solvent and 8 g of the corrosion inhibitor, heating to 130° C. under evenly stirring, then cooling to 110° C., adding 3 g of the itaconic acid, 5 g of the succinic acid and 10 g of the acrylic type activator prepared in Preparation example 3 under stirring, then cooling to 80° C., adding 8 g of the thixotropic agent for emulsification dispersion, then adding 3 g of the surfactant under stirring to obtain a mixture, then cooling the mixture to room temperature, reserving for 3 days, then grinding to obtain a welding flux, and stirring the Sn-2.5Be-0.8Ag-0.5Cu solder alloy powder and the welding flux with a mass radio of 90:10 under vacuum to obtain the solder paste.

In particular, the composite solvent was a mixture of methyl propylene glycol, tetrahydrofurfuryl alcohol and propylene glycol monophenyl ether in a mass ratio of 1:0.8:0.8; the modified rosin was a mixture of hydrogenated rosin and disproportionated rosin in
a mass ratio of 1:3;
the surfactant was cocoanut fatty acid diethanolamide;
the thixotropic agent was polyurea thixotropic agent; and
the corrosion inhibitor was benzotriazole.

Example 4

The preparation method for a lead-free and halogen-free solder paste of this example was same as Example 1 except that the acrylic type activator was the acrylic type activator prepared in Preparation example 4.

Example 5

The preparation method for a lead-free and halogen-free solder paste of this example was same as Example 1 except that the thixotropic agent was hydrogenated castor oil.

Example 6

The preparation method for a lead-free and halogen-free solder paste of this example was same as Example 1 except that the thixotropic agent was polyamide wax thixotropic agent.

Example 7

The preparation method for a lead-free and halogen-free solder paste of this example was same as Example 1 except that the surfactant was oleyl alcohol polyoxyethylene ether.

Example 8

The preparation method for a lead-free and halogen-free solder paste of this example was same as Example 1 except that the methyl propylene glycol in the composite solvent was replaced by equivalent amount of glycerol.

Example 9

The preparation method for a lead-free and halogen-free solder paste of this example was same as Example 1 except that the methyl propylene glycol in the composite solvent was replaced by equivalent amount of propylene glycol methyl ether.

Comparative Examples 1-3

The preparation method for a lead-free and halogen-free solder paste of comparative examples 1-3 were same as Example 1 except that the acrylic type activator was replaced by the acrylic type activators prepared in Comparative preparation examples 1-3, respectively.

Comparative Example 4

The preparation method for a lead-free and halogen-free solder paste of this comparative example was same as Example 1 except that the acrylic type activator was replaced by the acrylic type activator prepared in Comparative preparation example 3, and 3 g of the cyclohexylamine was further added except for the acrylic type activator.

Comparative Example 5

The preparation method for a lead-free and halogen-free solder paste of this comparative example was same as Example 1 except that the acrylic type activator was replaced by equivalent amount of triethanolamine

Comparative Example 6

The preparation method for a lead-free and halogen-free solder paste of this comparative example was same as Example 1 except that the itaconic acid was replaced by equivalent amount of malonic acid.

Performance Test

The solder paste prepared in the Examples and Comparative examples in the present application were tested for wettability and surface insulation resistance in accordance with Standards GB/T9491-2002 and IPC-TM-650. Further, the residual rate of the welding flux was tested, the test method for the residual rate of the welding flux was that, the solder paste with a mass defined as $m_1$ was weighted, and a ratio of the welding flux in the solder paste of the specific example was defined as ρ, the solder paste was coated on a 1010 aluminum substrate with a mass defined as $m_2$, a thickness of 1 mm, a length and a width of 40 mm to obtain a test soldering flake. The test soldering flake was placed on an induction cooker with a constant temperature of 120° C. to preheat for 15 s, then the soldering flake was placed on a lead-free tin furnace with a constant temperature of 250° C.

The solder was spread to form welding points, and the test soldering flake was removed after holding for 60 seconds. The test soldering flake was directly weighted to obtain a mass defined as m 3. The residual rate after welding was calculated through the formula $f=[m_3-m_2-(1-\rho)m_1]/(\rho m_1)$.

Test results were shown in the following table 1.

TABLE 1

| Test items | Example 1 | Example 2 | Example 3 | Example 4 | Example 5 | Example 6 | Example 7 | Example 8 |
|---|---|---|---|---|---|---|---|---|
| Wettability/% | 99.6 | 99.1 | 99.3 | 98.6 | 97.8 | 98.0 | 97.1 | 97.5 |
| Surface insulation resistance/Ω | $8.5 \times 10^{11}$ | $8.0 \times 10^{11}$ | $8.2 \times 10^{11}$ | $7.5 \times 10^{11}$ | $6.8 \times 10^{11}$ | $6.5 \times 10^{11}$ | $7.2 \times 10^{11}$ | $6.9 \times 10^{11}$ |
| Residual rate of the welding flux/% | 28 | 31 | 30 | 34 | 37 | 36 | 33 | 39 |

| Test items | Example 9 | Comparative example 1 | Comparative example 2 | Comparative example 2 | Comparative example 4 | Comparative example 5 | Comparative example 6 | — |
|---|---|---|---|---|---|---|---|---|
| Wettability/% | 97.4 | 97.6 | 97.2 | 96.2 | 96.8 | 96.3 | 85.2 | — |
| Surface insulation resistance/Ω | $7.2 \times 10^{11}$ | $5.8 \times 10^{11}$ | $6.2 \times 10^{11}$ | $4.9 \times 10^{11}$ | $4.5 \times 10^{11}$ | $4.8 \times 10^{11}$ | $7.9 \times 10^{11}$ | — |
| Residual rate of the welding flux/% | 38 | 46 | 44 | 48 | 44 | 47 | 35 | — |

Moreover, it can be observed that, the above scolder paste has no corrosion after welding. As can be seen from table 1 that, the scolder paste prepared in the examples of the present application have good welding performance and high insulation resistance, there is little residue after welding, with a good stability, and no corrosion.

Referring to the test data in Examples 1 and 4, when the acrylic type activator did not contain benzyl 1H-imidazole-1-carbodithioate, the final functional group grafting results of the acrylic type activator products may be affected, and the welding performance of the solder paste may be slightly decreased. Referring to the test data of Example 1 and Examples 5-6, as can be seen that, when the thixotropic agent is the polyurea thixotropic agent, a less residue and a higher surface insulation resistance is achieved, compared with commonly used hydrogenated castor oil and polyamide wax thixotropic agent. Referring to the test data of Example 7, as can be seen that, when the surfactant is nonionic surfactant-cocoanut fatty acid diethanolamide in Example 1, the wettability is better. Referring to the test data of Example 8-9, as can be seen that, when the mono-alkyl propylene glycol in the composite solvent is replaced by other solvents, there is more residue after welding and the surface insulation resistance is also reduced.

Referring to the test data of Example 1 and Comparative examples 1-3, as can be seen that, when the acrylic type activator only contains allyl glycidyl ether or acrylic acid, the wettability, the residue and the surface insulation resistance are decreased. Referring to the test data of Comparative example 4, when the raw materials of the acrylic type activator does not contain amine substances and the cyclohexylamine is directly added in the activator of the solder paste, there is more residue and the surface insulation resistance is significantly reduced. Referring to the test data of Comparative example 5, as can be seen that, when the acrylic type activator is replaced by equivalent amount of triethanolamine, the residue after welding is significantly increased and the surface insulation resistance is significantly reduced. Obviously, when itaconic acid is added, a good wettability is achieved, but there is more residue, and the surface insulation resistance is significantly reduced. Referring to the test data of Comparative example 6, as can be seen that, when the itaconic acid is replaced by other organic acid, the wettability was low.

The specific examples are only intended to illustrate the present application, not intended to limit the present application. Any non-creative changes can be made to the examples according to requirements by those skilled in the technical field after reading this specification, and these changes fall within the protection scope of the present application.

What is claimed is:

1. A lead-free and halogen-free solder paste comprising a solder alloy powder and a welding flux, wherein a mass ratio of the solder alloy powder to the welding flux is (85-90):(10-15), the solder alloy powder is Sn-2.5Be-0.8Ag-0.5Cu alloy powder, and the welding flux comprises the following components in parts by weight:
   1-3 parts of itaconic acid,
   3-5 parts of succinic acid,
   1-3 parts of a surfactant,
   3-8 parts of a thixotropic agent,
   10-20 parts of modified rosin,
   20-40 parts of a composite solvent,
   3-8 parts of a corrosion inhibitor, and
   5-10 parts of an acrylic activator;
   wherein the acrylic activator is obtained after allyl glycidyl ether and bisphenol A diglycidyl ether are reacted with acrylic acid, acrylic anhydride, and cyclohexylamine.

2. The lead-free and halogen-free solder paste according to claim 1, wherein the acrylic activator is prepared by the following raw materials in parts by weight:
   20-30 parts of the allyl glycidyl ether, 5-10 parts of the bisphenol A diglycidyl ether, 15-20 parts of the acrylic acid, 5-10 parts of the acrylic anhydride, 15-20 parts of the cyclohexylamine, 1-3 parts of benzyl 1H-imidazole-1-carbodithioate, and 3-5 parts of tetrahydrofuran.

3. The lead-free and halogen-free solder paste according to claim 2, wherein the acrylic activator is prepared by the following method:

mixing the allyl glycidyl ether, the bisphenol A diglycidyl ether and the tetrahydrofuran, adding the benzyl 1H-imidazole-1-carbodithioate, adding the acrylic acid, the acrylic anhydride and the cyclohexylamine after mixing, performing a cross-linking reaction under γ-ray radiation at a rate of 50-60 Gy/min for 30-40 min, and reacting in an oil bath of 85-90° C. for 1.5-2 h to obtain the acrylic activator.

4. The lead-free and halogen-free solder paste according to claim 1, wherein the composite solvent is a mixture of methyl propylene glycol, tetrahydrofurfuryl alcohol and propylene glycol monophenyl ether in a weight ratio of 1:(0.6-0.8):(0.5-0.8), respectively.

5. The lead-free and halogen-free solder paste according to claim 1, wherein the modified rosin is a mixture of a hydrogenated rosin and a disproportionated rosin in a weight ratio of 1:(2-3), respectively.

6. The lead-free and halogen-free solder paste according to claim 1, wherein the surfactant is a nonionic surfactant.

7. The lead-free and halogen-free solder paste according to claim 1, wherein the thixotropic agent is a polyurea thixotropic agent.

8. The lead-free and halogen-free solder paste according to claim 1, wherein the corrosion inhibitor is one or more selected from a group consisting of azole organic corrosion inhibitors and imidazole organic corrosion inhibitors.

\* \* \* \* \*